6499X
J. Hale,
Hay Press.
Patented Apr. 20, 1831.
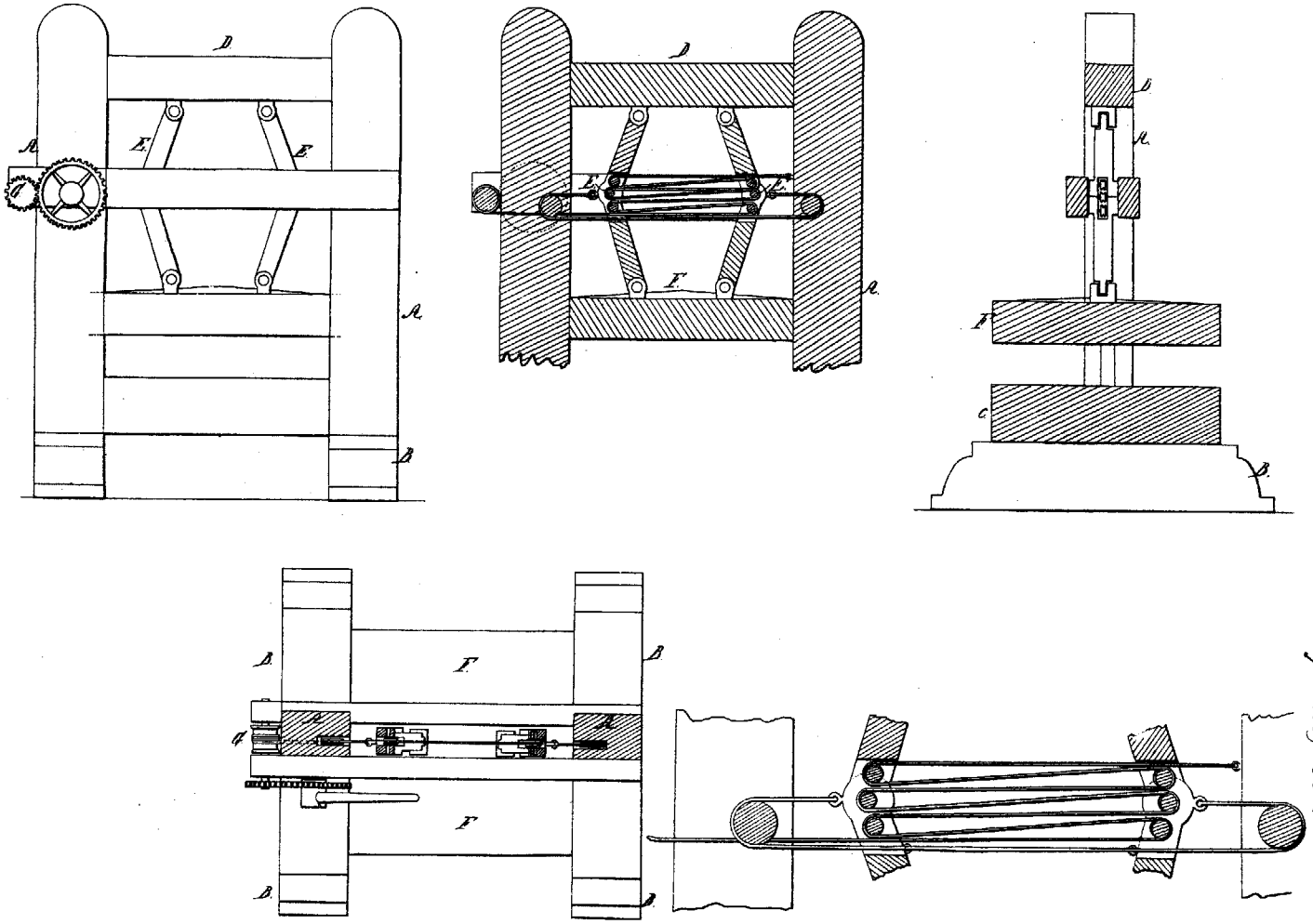
A.M. PHOTO-LITHO. CO. N.Y. (OSBORNE'S PROCESS)

4/20/1831 6499X

John Hale,
Letters Patent

The schedule referred to in these Letters Patent and making part of the same containing a description in in the words of the said John Hale himself of his improvement in the upright toggle joint press -

Be it known that I the said John Hale have invented, constructed made and applied to use a new and useful improvement in the upright toggle press called "Hales improved press". which I specify in the following manner -
This press is constructed in common upright frame, consisting of two posts, supported at the bottom by two cills, or feet with a strong bed piece framed from post to post, near the bottom and a strong beam near the top -.
There are two toggle joints swivelled at the top to the under side of the beam; and swivelled at the bottom to the upper side of a plattin. The toggles are perpendicular, when straightened and are parallel to each other. The joints play outward. The plattin is made to move steadily up and down by a tenon on each end, which is guided in a groove made in the inner side of each post - In the centre of each toggle joint is a mortice or slit long enough to admit several sheaves or pulleys, say three, which are fitted therein on strong round bolts or pins - - - - -
A rope made fast to one post, at the same height of the upper sheave, is so run round each sheave in each toggle joint alternately, one and the other, that the run, going off through the other post, will cause the toggle joints to approach each other. The run, or end of the rope is attached to a windlass which is turned by a wheel and pinion - -
The windlass is supported between two timbers, made fast to the posts, one on each side which also guide the toggle joints laterally and keep them steady. There is a mortise made near the edge of each post and a sheave placed in each, on a horizontal line with the toggle joints. Two ropes are made fast one to each toggle joint, then carried outwards to their respective posts, take a turn over the sheaves and pass back through their toggles and make fast to the opposite toggles, so that the opposite

4/20/1831 6499X

332.

end of each rope is made fast to the opposite Toggles, accordingly when
the toggles act, one gives out the same length of rope that the other takes
up, which contrivance causes the toggles to keep exact pace with one an-
other. The parts of the above described machine which I claim as my
invention, and for which a patent is solicited is the application of the
several pullies, or sheaves to the toggle joints, and the application of the
ropes. In Testimony that the above is a true specification of my said
improvement, I have hereunto set my hand and seal this sixth day
of April in the year of our Lord one thousand eight hundred and thirty
one — —

John Hale (L.S.)

Witnesses
John Dwight
Augustus Peabody

Exd.
[illegible]

591 [illegible]